(12) United States Patent
Laws et al.

(10) Patent No.: US 8,452,142 B1
(45) Date of Patent: May 28, 2013

(54) RAILWAY DEPLOYABLE COMPOSITE COMMUNICATION CABLE

(75) Inventors: Jeffrey Scott Laws, Brownwood, TX (US); Julie Anne Burnett, Acworth, GA (US); Scott Howard Larose, Brownwood, TX (US)

(73) Assignee: Superior Essex Communications LP, Atlanta, GA (US)

( * ) Notice: Subject to any disclaimer, the term of this patent is extended or adjusted under 35 U.S.C. 154(b) by 234 days.

(21) Appl. No.: 12/806,757

(22) Filed: Aug. 20, 2010

(51) Int. Cl.
  *G02B 6/44* (2006.01)
(52) U.S. Cl.
  USPC .......................................... 385/101
(58) Field of Classification Search
  USPC .......................... 385/107–111, 101
  See application file for complete search history.

(56) References Cited

U.S. PATENT DOCUMENTS 5,509,097 A * 4/1996 Tondi-Resta et al. ......... 385/113
5,905,834 A * 5/1999 Anderson et al. ............. 385/111

* cited by examiner

*Primary Examiner* — Eric Wong

(57) ABSTRACT

A communication cable can comprise twisted pairs of electrical conductors for transmitting electrical signals and bundles of optical fibers for transmitting optical signals. The electrical signals and/or the optical signals can support voice and digital communication or data transmission. The twisted pairs can be encased in a gelatinous material and disposed along a central axis of the communication cable. Each bundle of optical fibers can be disposed in a respective buffer tube. The buffer tubes can be arranged in a ring around the twisted pairs. The communication cable can be configured to manage strain on the optical fibers without subjecting the twisted pairs to deleterious tensile stress. The communication cable can include strength rods embedded in an outer jacket, with the outer jacket sized for insertion in a conduit running along a railway or other transportation line.

24 Claims, 1 Drawing Sheet

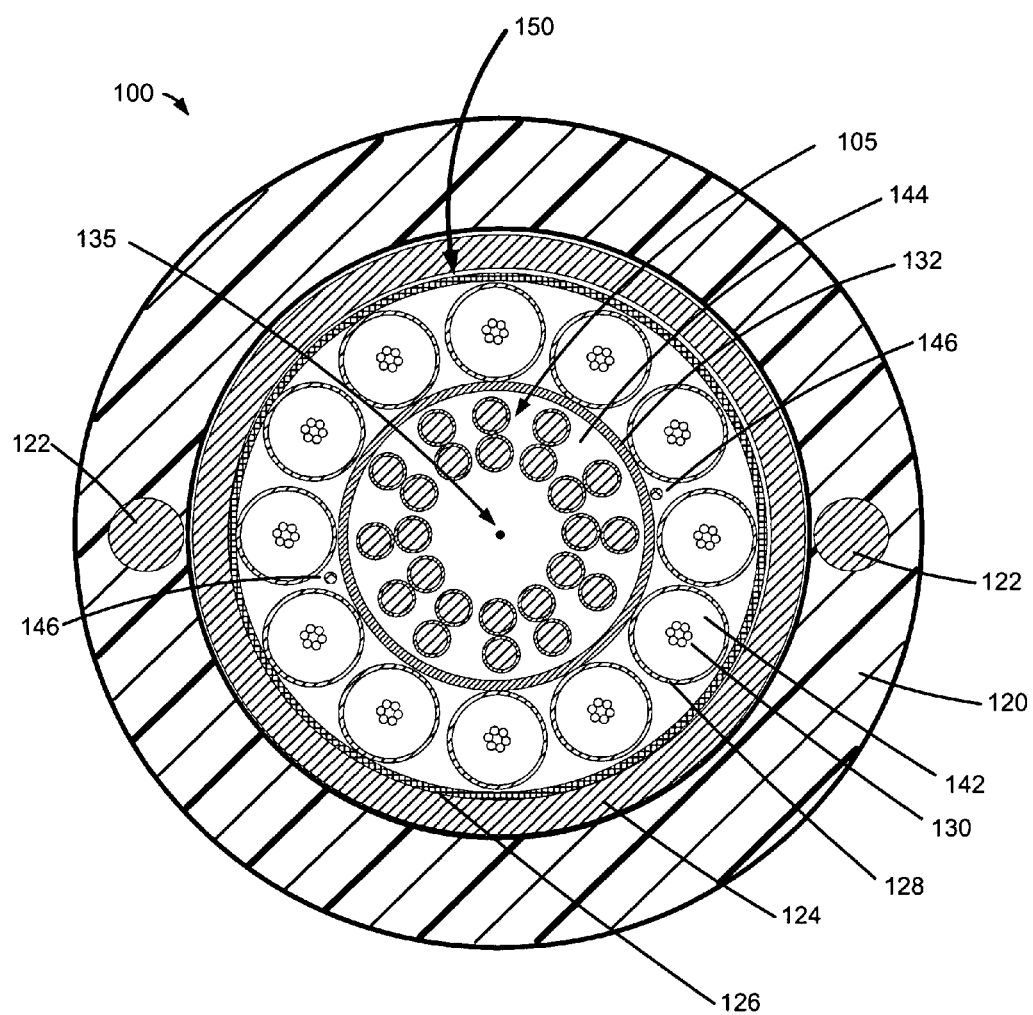

RAILWAY DEPLOYABLE COMPOSITE COMMUNICATION CABLE

FIELD OF THE TECHNOLOGY

The present invention relates to composite communication cables suited for railway applications and including twisted pairs of individually insulated electrical conductors and bundles of optical fibers.

BACKGROUND

Typical high-performance communication cables in widespread use contain twisted pairs for transmitting electrical communication signals or optical fibers for transmitting optical communication signals, but usually not both. Engineering requirements for optical communication cables are typically very different than engineering requirements for electrical communication cables.

Communication cables that successfully transmit electrical communication signals and comply with industry specifications for electrical signals, such as ICEA S-84-608, ordinarily are designed to manage cabling forces that the twisted pairs experience in connection with installation, pulling, thermal expansion, and other conditions. This management can include translating cabling forces to cross sectional areas of the cables that are separated from the twisted pairs. Meanwhile, communication cables that successfully transmit optical communication signals and comply with industry specifications for optical signals, such as GR-20-Core, ordinarily are designed to manage cabling forces that the optical fibers experience in connection with installation, pulling, thermal expansion, and other conditions. This management can include translating cabling forces to cross sectional areas of the cables that are separated from the optical fibers.

However, for a cable containing optical fibers and twisted pairs, the translation of cabling forces is typically complicated by an objective of avoiding a translated force from encroaching on the optical fibers or the twisted pairs. Moreover, twisted pairs and optical fibers are sensitive to different types of stress and strain and further can generate forces that can interfere with one another.

Accordingly, need exists for a technology that supports disposing optical fibers and twisted pairs in a single cable while managing cable forces to achieve robust optical and electrical signal performance. Need further exists for a composite cable that can be deployed along a railway or other transportation line and meet specialized railway and transportation objectives. A capability addressing such need or some other related deficiency in the art could facilitate transmitting quality optical communication signals and quality electrical communication signals over a compact cable.

SUMMARY

The present invention can support transmitting electrical communication signals and optical communication signals in a common cable deployed adjacent a transportation pathway along which vehicles travel, such as a railway.

In one aspect of the present invention, a communication cable can comprise multiple electrical conductors for transmitting multiple electrical communication signals concurrently and multiple optical fibers for transmitting multiple optical communication signals concurrently. The communication cable can be engineered to manage strain on the optical fibers and tensile stress on the electrical conductors. The electrical conductors can be twisted pairs of individually insulated electrical conductors located in a central area of the cable and encased in a gelatinous material. A ring of buffer tubes can encircle the group of twisted pairs. Each buffer tube can carry a respective bundle of optical fibers. The communication cable can comprise one or more strength members and an outer jacket.

The discussion of communication cables presented in this summary is for illustrative purposes only. Various aspects of the present invention may be more clearly understood and appreciated from a review of the following detailed description of the disclosed embodiments and by reference to the drawing and the claims that follow. Moreover, other aspects, systems, methods, features, advantages, and objects of the present invention will become apparent to one with skill in the art upon examination of the following drawing and detailed description. It is intended that all such aspects, systems, methods, features, advantages, and objects are to be included within this description, are to be within the scope of the present invention, and are to be protected by the accompanying claims.

BRIEF DESCRIPTION OF THE DRAWING

The FIGURE is a cross sectional view of an exemplary communication cable that comprises twisted pairs of individually insulated electrical conductors and optical fibers in accordance with certain embodiments of the present invention.

Many aspects of the invention can be better understood with reference to the drawing. The depicted elements and features are not to scale, emphasis instead being placed upon clearly illustrating principles of exemplary embodiments of the present invention. Moreover, certain dimensions may be exaggerated to help visually convey such principles. Like reference numerals designate like or corresponding, but not necessarily identical, elements.

DETAILED DESCRIPTION OF EXEMPLARY EMBODIMENTS

Technology for managing strain on optical fibers and tensile stress on electrical conductors in a common, composite communication cable will now be described more fully with reference to the FIGURE, which describes representative embodiments of the present invention. A communication cable incorporating stress and strain management technology can be deployed along a railway or other vehicular route, for example. In such an application, twisted pairs of insulated electrical conductors within the cable can transmit electrical signals carrying voice between call boxes along the route. Optical fibers of the cable can transmit optical signals providing high-speed data transmission, for example. In certain embodiments, the communication cable can meet two industry specifications for communication cables, one focused on or specific to optical requirements and one focused on or specific to electrical requirements. For example the communications cable can comply with ICEA S-84-608 for electrical signals/twisted pairs and with GR-20-Core for optical signals/optical fibers.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting and among others supported by representations of the present invention.

Turning now to the FIGURE, a cross sectional view is illustrated of a communication cable 100 that comprises twisted pairs 105 of individually insulated electrical conductors and optical fibers 130 according to certain exemplary embodiments of the present invention.

In certain exemplary embodiments, the communication cable 100 can be rated for an operating temperature of about −40 to 70 degrees Centigrade, can have a circular profile and size that facilitates duct or conduit installation, and can withstand installation tensile loading of about 600 pounds of force. In certain exemplary embodiments, the communication cable 100 can be rodent resistant, for example via an armor 124 made of a metal such as steel or a dielectric material.

An outer jacket 120 typically having a polymer-based composition seals the communication cable 100 from the environment and provides strength and structural support. In various embodiments, the outer jacket 120 comprises polymeric material, medium density polyethylene ("MDPE"), polyvinyl chloride ("PVC"), polyvinylidene fluoride ("PVDF"), polyurethane, one or more polymers, a fluoropolymer, polyethylene, neoprene, cholorosulphonated polyethylene, fluorinated ethylene propylene ("FEP"), flame retardant PVC, low temperature oil resistant PVC, polyolefin, flame retardant polyurethane, flexible PVC, or some other appropriate material known in the art, or a combination thereof, for example. In certain exemplary embodiments, the outer jacket 120 can comprise flame retardant and/or smoke suppressant materials. The outer jacket 120 can comprise carbon black or other suitable material for protection against exposure to ultraviolet ("UV") light.

In certain exemplary embodiments, the outer jacket 120 has an outer diameter that is sized for insertion in a conduit or duct having a nominal or approximate internal diameter of about one inch (25.4 millimeters "mm"). In certain exemplary embodiments, the outer jacket 120 has an outside diameter that is less than or equal to about 0.65 inches (16.5 mm). In various exemplary embodiments, the outer jacket 120 can have an outer diameter that is about 10 mm, 12 mm, 15 mm, 16 mm, 16.5 mm, 16.7 mm, 17 mm, 18 mm, 20 mm, 22 mm, 25 mm, 25.4 mm, or 30 mm, or in a range between any two of these dimensions, or that is less than one of these dimensions for example.

In certain exemplary embodiments, the outer jacket 120 has a circular cross section or a substantially round outside diameter. In certain exemplary embodiments, the outer jacket 120 has an oval profile that deviates substantially or visually from circular. In a case of such an oval profile, the size values disclosed in the previous paragraph can describe the largest cross sectional dimension of the communication cable 120.

The outer jacket 120 can be single layer or have multiple layers of extruded material. In various embodiments, the outer jacket 120 can be characterized as an outer sheath, a casing, a circumferential cover, or a shell.

In the illustrated embodiment, the communication cable 100 includes a pair of strength rods 122, which can be viewed as strength members, that the outer jacket 120 covers. In the illustrated configuration, the strength rods 122 enhance tensile strength of the communication cable 100. As illustrated, the strength rods 122 are substantially embedded in the outer jacket 120 and are located on opposing lateral sides of the longitudinal axis 135 of the communication cable 100. The strength rods 122 may be comprised of a metal such as steel, fiberglass, or glass-reinforced plastic ("GRP"), for example.

In certain exemplary embodiments, the strength rods 122 cause the outer surface of the outer jacket 120 to bulge or protrude (not illustrated) lateral to the strength rods 122. Accordingly, the strength rods 122 can cause either a slight or a significant deviation from exactly circular in the cross sectional profile of the communication cable 100, for example.

The communication cable 100 can comprise strength members contacting the outer jacket 120 and arranged substantially symmetrically about the longitudinal axis 135. In various embodiments, such strength members can comprise aramid yarn that may be reinforced with plastic, glass, rods, tapes, metal, or other suitable material. In certain exemplary embodiments, such strength members can form a ring around the longitudinal axis 135 and central portion of the communication cable 100.

In certain exemplary embodiments, the communication cable 100 can comprise a messenger (not illustrated) that can be co-extruded with the outer jacket 120. Such a messenger can provide sufficient strength for aerial applications, for example. In certain exemplary embodiments, the communication cable 100 can comprise strength yarns (not illustrated) providing sufficient strength for aerial deployment.

As illustrated, the exemplary communication cable 100 comprises an armor 124 defining a core 150 of the cable and providing mechanical protection, for example providing rodent resistance. The armor 124 can comprise a tape that is formed into a tube and has a composition of steel or other appropriate metal, for example. The armor 124 can comprise a strip of steel formed so as to interlock with itself and/or may be corrugated, for example. The armor 124 can be coated with a polymer to promote adhesion, bonding, or a selected level of friction with the interior surface of the outer jacket 120, for example. As an alternative to metal, the armor 124 can be made exclusively from one or more dielectric materials, including fiberglass, glass, epoxy, and/or appropriate polymeric materials, for example. In certain exemplary embodiments, rodent resistance is provided by adding strength members or materials to the jacket 120, for example during extrusion.

In certain exemplary embodiments, the communication cable 100 comprises a flooding compound under the outer jacket 120. For example, the strength rods 122 and the outer surface of the armor 124 (which can comprise a polymer coat as discussed above) can be wetted or in contact with a flooding compound such as a thermoplastic flooding compound.

In certain exemplary embodiments (not illustrated), the communication cable 100 can comprise a double jacket with a double armor. In certain exemplary embodiments (not illustrated), the communication cable 100 can comprise a double jacket with a single armor. In certain exemplary embodiments (not illustrated), the communication cable 100 can comprise a double jacket without an armor. In certain exemplary embodiments (not illustrated), the communication cable 100 can comprise a single jacket without an armor.

In the illustrated embodiment, the core 150 of the communication cable 100 comprises twelve twisted pairs 105 of individually insulated electrical conductors. The insulation can be a foamed polymeric material with a non-foamed or solid polymeric skin, for example. The illustrated number of twisted pairs 105 is exemplary, rather than limiting. Other embodiments of the communication cable 100 can have a wide range of numbers of twisted pairs 105, i.e. fewer or more than illustrated.

Each twisted pair 105 can carry voice, data, or some other form of information. For example, each twisted pair 105 can carry data in a range of about one to ten Giga bits per second ("Gbps") or another appropriate speed, whether faster or slower. In certain exemplary embodiments, each twisted pair supports data transmission of about two and one-half Gbps (e.g. nominally two and one-half Gbps). In certain exemplary embodiments, each twisted pair 105 supports data transmission of about ten Gbps (e.g. nominally ten Gbps). In certain exemplary embodiments, the twisted pairs 105 carry voice information or voice traffic exclusively. Whether voice, data, or other information or a combination of information types, each twisted pair 105 typically provides a distinct information channel.

In certain exemplary embodiments, the metallic conductor diameter of each twisted pair 105 can be in a range of about 0.0223 inches to about 0.0227 inches. In certain exemplary embodiments, the twisted pair electrical conductors can have a diameter in a range of about 0.0201 to 0.0253 inches, for example. In certain exemplary embodiments, the electrical conductors can be 22, 23, or 24 AWG (American Wire Gauge). In certain exemplary embodiments, the electrical conductors of the twisted pairs 105 have consistent or common diameter, for example being manufactured to a common specification. Alternatively, in certain exemplary embodiments, different twisted pairs 105 can have different conductor diameters.

In exemplary certain embodiments, the outer, insulation diameter covering each metallic conductor can be in a range of about 0.0385 inches to about 0.0395 inches, for example. In certain exemplary embodiments, the insulation of the twisted pairs 105 can be foamed with a skin. Alternatively, the twisted pairs 105 can have solid insulation. In various embodiments, insulations of the twisted pairs 105 can comprise HDPE, FEP, PVC, or a polyolefin such as PE, PP, or a copolymer.

At least two of the twisted pairs can have different twist rates (twists-per-meter or twists-per-foot). That is, at least two of the twisted pairs 105 have different twist lengths or twist lays, which can be characterized in units of centimeters-per-twist, inches-per-twist, or inches-per-lay. In certain exemplary embodiments, each of the twisted pairs 105 has a different twist length. That is, every twisted pair 105 in the communication cable 100 can have a different twist rate.

In certain exemplary embodiments, the differences between twist rates of twisted pairs 105 that are circumferentially adjacent one another are greater than the differences between twist rates of twisted pairs 105 that are diagonal or otherwise separated from one another. The different twist lengths can help reduce crosstalk among the twisted pairs 105. Physically separating the twisted pairs 105 having similar twist rates while increasing the twist differential between adjacent or neighboring twisted pairs 105 can reduce susceptibility to cross talk.

The twisted pairs 105 can be bunched together such that the group of twisted pairs 105 exhibits a collective twist. More generally, the twisted pairs 105 can form a bundle. While the FIGURE illustrates relatively large interstices associated with the twisted pairs 105, the individual twists and the collective twists of the twisted pairs 105 typically reduces interstitial space, as will be appreciated by those of ordinary skill having benefit of this disclosure. That is, the FIGURE may be viewed as exaggerating interstitial space within the group of twisted pairs 105.

In the illustrated embodiment, a film 132, typically in a tape format and comprising polyester or other suitable polymer, is wrapped about the twisted pairs 105 to form a tube. A water-blocking material 144 can be disposed in the volume formed by the tube of film 132. In certain exemplary embodiments, the film 132 is replaced with (or covered by) a jacket. In certain exemplary embodiments, such a jacket can be extruded. In certain exemplary embodiments, such a jacket and the circumferentially covered twisted pairs 105 can form a twisted pair cable. Accordingly, the core 150 of the communication cable 100 can comprise an internal cable carrying electrical communication signals over the twisted pairs 105. That internal cable can be broken out from the communication cable 100 during installation of the communication cable 100 without severing optical fibers 130 of the communication cable 100, for example.

The water-blocking material 144 can coat each of the twisted pairs 105. The twisted pairs 105 can be embedded in water-blocking material 144. In an exemplary embodiment, the water-blocking material 144 comprises a gelatinous or semi-liquid substance. The water-blocking material 144 can comprise an extended thermoplastic rubber floodant ("ETPR"), for example. In an exemplary embodiment, the tube of film 132 is substantially filled with the water-blocking material 144 and the twisted pairs 105.

Alternatively, the tube of film 132 can be filled with a gas such as air, powder, a moisture absorbing material, a water-swellable substance, dry filling compound, or foam material, for example in interstitial spaces between the twisted pairs 105. Other elements can be added, for example one or more optical fibers, additional electrical conductors, or strength members, depending upon application goals.

In certain exemplary embodiments, the communication cable 100 comprises a flexible member or pair separator (not illustrated) that maintains a desired orientation of the twisted pairs 105 to promote signal performance. In various exemplary embodiments, such a flexible member can comprise polypropylene, PVC, polyethylene, FEP, ethylene chlorotrifluoroethlyene ("ECTFE"), or some other suitable polymeric or dielectric material, for example. If used, such a flexible member can be filled, unfilled, foamed, un-foamed, homogeneous, or inhomogeneous and may or may not comprise additives. In certain exemplary embodiments, the flexible member can comprise electrically conductive patches that are electrically isolated from one another to provide one or more shields. Such patches can adhere to a surface of the flexible member, for example.

In certain exemplary embodiments, the communication cable 100 can comprise shielding or may be unshielded. In certain exemplary embodiments, a metallic foil or other electrically conductive material can cover the twisted pairs 105 and/or the cable core 150 to provide shielding. In certain exemplary embodiments, the communication cable 100 can be shielded with a system of electrically isolated patches of shielding material, for example as described in U.S. patent application Ser. No. 12/313,914, entitled "Communication Cable Comprising Electrically Isolated Patches of Shielding Material," the entire contents of which are hereby incorporated herein by reference.

In certain exemplary embodiments, a metallic material other than the armor 124, whether continuous or comprising electrically conductive patches, can be disposed on a substrate, such as a tape, and placed between the twisted pairs 105 and the jacket 120. In certain embodiments, such a material may adhere to an interior surface of the jacket 120. Shielding, whether continuous or electrically isolated, can be disposed or sandwiched between the jacket 120 and a tube or tape that is disposed between the jacket 120 and the twisted pairs 105. In certain embodiments, the jacket 120 comprises conductive material and may be a shield and/or function as a shield.

In the illustrated embodiment, the communication cable 100 comprises twelve buffer tubes 128 arranged in a ring around the twisted pairs 105 and the associated film 132 that forms a tube as discussed above. Twelve is an exemplary number of buffer tubes 128; various other embodiments can have fewer or more. In an exemplary embodiment, the buffer tubes 128 comprises polybutylene terephthalate (PBT) or polypropylene or other suitable polymer. In certain embodiments, the buffer tubes 128 can be a composite or comprise multiple polymeric materials. In an exemplary embodiment, the each buffer tube 128 has an inner diameter of about 1.3 mm and an outer diameter of about 2.0 mm, such dimensions being examples rather than limiting.

Each buffer tube 128 carries a bundle of optical fibers 130 and a water-blocking material 142, such as a gel, grease, or other appropriate material. The water-blocking material 142 can coat each of the optical fibers 130. The optical fibers 130 can be embedded in water-blocking material 142. In an exemplary embodiment, the water-blocking material 142 comprises a gelatinous or semi-liquid substance. In an exemplary embodiment, each buffer tube 128 is substantially filled with the water-blocking material 142 and the optical fibers 130.

Alternatively, the buffer tubes 128 can be filled with a gas such as air, powder, a moisture absorbing material, a water-swellable substance, dry filling compound, or foam material, for example in interstitial spaces between the optical fibers 130. Other elements can be added, for example strength members, strength yarns, tapes, solid or foamed polymeric filler rods, or electrical conductors, depending upon application goals.

In the illustrated embodiment, each buffer tube 128 carries six optical fibers 130, six being an exemplary rather than limiting number. In certain exemplary embodiments, each buffer tube 128 carries about six to twelve optical fibers 130; however, more or fewer can carried. The optical fibers 130 are typically single mode fibers, but may alternatively be multimode. Each optical fiber 130 typically transmits pulses of light or optical communication signals carrying data or another form of information, for example.

The optical fibers 130 of the individual buffer tubes 128 can be bundled together via imparting the fibers 130 with a common twist. In certain embodiments, the optical fibers 130 can be oscillated in reverse-oscillating-lay with a lay length that manages tensile and environmental contractive strain on the optical fibers 130.

In certain exemplary embodiments, the communication cable 100 comprises one or more solid or foamed polymeric rods that maintain geometry of the communication cable 100. For example, the ring of buffer tubes 128 can be replaced with a ring of solid or foamed polymeric rods.

The illustrated embodiment of the communication cable 100 further comprises water swellable materials 126, 146 for impeding flow of any water that inadvertently enters the cable 100, for example due to damage of the outer jacket 120. Upon contact with water, the water swellable materials 126, 146 can absorb the water and swell, helping to prevent the water from damaging the optical fibers 130. Impeding the longitudinal flow of water also helps confine any fiber damage to facilitate repair.

In the illustrated embodiment, the water swellable material 146 comprises water swellable yarn that is located between the film 132, which can be shaped into a tube as discussed above, and the buffer tubes 128. In certain embodiments, the water sellable material 146 comprises multiple yarns that wrap around the film 132. In certain embodiments, the water swellable material 146 can be disposed between two of the buffer tubes 128. As illustrated, the water swellable material 126 is a water swellable tape that is disposed between the buffer tubes 128 and the armor 124. The water swellable material 126 and the water swellable material 146 can each comprise a super absorbent polymer or other material that swells in the presence of water, for example.

Tables 1, 2, and 3 provide representative design parameters for a communication cable in accordance with an exemplary embodiment of the present invention. The values and parameters presented in Tables 1, 2, and 3 are representative but not limiting. These parameters and values, and others implemented in accordance with the present teaching by those of ordinary skill, can support balancing and managing cabling forces experienced by the optical fibers 130 and the twisted pairs 105 during installation, cable pulling, thermal expansion and contraction, and other cabling operations and conditions. Accordingly, the communication cable 100 can achieve robust optical and electrical performance across diverse conditions and can meet both fiber optic industry standards and electrical industry standards.

TABLE 1

Exemplary Design Parameters for a Representative Embodiment

| Process | Design Parameter | | Design |
|---|---|---|---|
| Copper Core Unit | Twisted pairs | # of pairs | 12 |
| | | Wire gauge | 24 AWG |
| | | Insulation type | Foam-skin |
| | | Material type | HDPE, natural |
| | | Material type | HDPE foam agent |
| | Bundling components | Filling compound | ETPR, 80° |
| | | Wrap type | 0.003 × 1 inch Polyester |
| | | Wrap binder type | Flat Poly, 1000 D, 1E |
| Fibers | Optical fibers | # of fibers | 72 |
| | | Fiber type | Single mode |
| Coloring | Fiber coloring | Dia. of colored fiber | 250 µm |
| Buffer Tubing | Excess fiber length | | 0.05% |
| | Tube | Material type | PBT |
| | | # of tubes | 12 |
| | | Diameter (inner/outer) | 1.3 mm / 2.0 mm |
| | | # fibers per tube | 6 |
| | Filling compound | Material type | Gel, Buffer Tube |
| Jacketing | Water blocking materials | Material type | Water-Blocking Yarns |
| | | - Position | Wrapped around central copper core |
| | | Material type | Water-swellable Tape |
| | | - Position | Around fiber tubes, under armor |
| | | Position/# of ripcords | 180° apart under armor/2 |

TABLE 1-continued

Exemplary Design Parameters for a Representative Embodiment

| Process | Design Parameter | | Design |
|---|---|---|---|
| | | Position/# of ripcords | 180° apart over armor/2 |
| | Longitudinal strength member | Material type, OD | Steel Music Wire, 0.060" |
| | | # of strength members | 2 |
| | | Position | 180° apart over armor |
| | Armor | Material type | 2S Coated Steel Armor, 0.010 × 1⅝" |
| | | Position | Longitudinally applied over WST |
| | Thermoplastic Flooding Compound | Material type | Commercially flooding compound |
| | | Position | Over armor and strength rods |
| | Jacket | Material type | MDPE, Blk |
| | | Thickness, nominal | 2.2 mm |
| | | Cable OD, inches (mm) | 0.64 (16.3) |

TABLE 2

Additional Design Parameters for a Representative Embodiment - Exemplary Lay Lengths of Twisted Pairs

| Pair | Tip | Ring | Design Twist Lay, inches |
|---|---|---|---|
| 1 | White | Blue | 2.00 |
| 2 | White | Orange | 4.70 |
| 3 | White | Green | 3.10 |
| 4 | White | Brown | 5.20 |
| 5 | White | Slate | 3.90 |
| 6 | Red | Blue | 2.80 |
| 7 | Red | Orange | 4.10 |
| 8 | Red | Green | 3.70 |
| 9 | Red | Brown | 2.20 |
| 10 | Red | Slate | 4.90 |
| 11 | Black | Blue | 2.70 |
| 12 | Black | Orange | 4.50 |

TABLE 3

Additional Design Parameters for a Representative Embodiment - Exemplary Dimensions

| Component, Parameter | Value |
|---|---|
| Cable OD, mm | 16.3 |
| Jacket Thickness, mm | 2.3 |
| Jacket Thickness over Steel Rod, mm | 0.9 |
| Buffer Tube OD, mm | 1.9 |
| Buffer Tube ID, mm | 1.2 |
| Copper Core OD, mm (After Cabling) | 5.2 |
| Finished Cable Weight, kg/km | 284 |

From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is to be limited only by the claims that follow.

What is claimed is:

1. A communication cable comprising:
an outer jacket;
a pair of strength rods, each at least partially embedded in the outer jacket and extending lengthwise on opposing lateral sides of the communication cable;
a metal armor substantially adjoining the outer jacket and extending lengthwise;
a tube running lengthwise and circumferentially disposed about a longitudinal axis of the communication cable;
a plurality of twisted pairs of individually insulated electrical conductors disposed in the tube;
a plurality of buffer tubes disposed between the metal armor and the tube and forming a ring that encircles the tube at a cross-sectional point along the tube, each buffer tube carrying a plurality of optical fibers;
a first water swellable material disposed between the ring of buffer tubes and the metal armor; and
a second water swellable material disposed between the ring of buffer tubes and the tube.

2. The communication cable of claim 1, wherein the first water swellable material comprises a water swellable tape and the second water swellable material comprises a water swellable yarn.

3. The communication cable of claim 1, wherein the gelatinous material comprises an extended thermoplastic rubber floodant (ETPR) and each of the buffer tubes comprises polybutylene terephthalate (PBT).

4. The communication cable of claim 1, wherein the plurality of twisted pairs of individually insulated electrical conductors comprises twelve pairs of individually insulated electrical conductors.

5. The communication cable of claim 1, wherein the plurality of buffer tubes forming the ring comprises twelve buffer tubes.

6. The communication cable of claim 5, wherein each of the buffer tubes carries at least six optical fibers.

7. The communication cable of claim 1, further comprising interstitial spaces between adjacent buffer tubes in the ring of buffer tubes, wherein air is disposed in the interstitial spaces.

8. The communication cable of claim 1, wherein the cable has an outer diameter suitable for disposing lengthwise in a conduit having a nominal or approximate inner diameter of about one inch, the outer diameter having a substantially round or oval profile.

9. The communication cable of claim 1, wherein the plurality of twisted pairs of individually insulated electrical conductors are disposed in the tube along with a gelatinous material, the plurality of twisted pairs and the gelatinous material substantially filling the tube.

10. A composite cable for transmitting electrical communication signals and optical communication signals along a railway, comprising:
an outer jacket having an outer diameter not more than 20 millimeters;

a first strength rod and a second strength rod, each at least partially embedded in the outer jacket, with a longitudinal axis of the cable disposed between the first strength rod and the second strength rod;

a metal armor disposed under the outer jacket;

a plurality of twisted pairs of individually insulated electrical conductors embedded in a central tube filled with a gelatinous material, each twisted pair operative to transmit a respective one of the electrical communication signals;

a plurality of buffer tubes arranged in a ring about the central tube, each buffer tube carrying a bundle of optical fibers, each optical fiber operative to transmit a respective one of the optical communication signals;

a first water swellable material disposed between at least one of the buffer tubes and the metal armor; and a second water swellable material disposed between at least one of the buffer tubes and the plurality of twisted pairs of individually insulated electrical conductors.

11. The composite cable of claim 10, wherein each of the buffer tubes are filled with a filling compound.

12. The composite cable of claim 10, wherein the number of the buffer tubes in the cable and the number of the twisted pairs of individually insulated electrical conductors in the cable are equal.

13. The composite cable of claim 10, wherein the central tube is formed from a tape disposed between the plurality of buffer tubes and the plurality of twisted pairs of individually insulated electrical conductors.

14. The composite cable of claim 10, wherein each bundle of optical fibers comprises six optical fibers.

15. The composite cable of claim 10, wherein the plurality of buffer tubes comprises twelve buffer tubes, wherein each of the bundles of optical fibers comprises six single mode optical fibers, and wherein the plurality of twisted pairs comprises twelve twisted pairs.

16. A communication cable comprising:

a metal armor defining an interior space that extends lengthwise along a longitudinal axis of the communication cable;

a jacket circumferentially covering the metal armor;

two strength rods disposed between an exterior surface of the jacket and the metal armor, with the longitudinal axis disposed between the two strength rods;

a bundle of twisted pairs of individually insulated electrical conductors substantially encased in a gelatinous material and circumferentially covered by a tape, with the longitudinal axis extending lengthwise through the bundle of twisted pairs;

a ring of buffer tubes circumferentially disposed about the bundle of twisted pairs such that the bundle of twisted pairs is encircled by the ring of buffer tubes at a cross-sectional point along the communication cable, each buffer tube substantially filled with a filling compound and a respective bundle of optical fibers;

a plurality of water swellable yarns contacting a plurality of the buffer tubes; and a water swellable tape contacting a plurality of the buffer tubes.

17. The communication cable of claim 16, wherein the twisted pairs are operative to transmit electrical communication signals along a railway and the communication cable complies with ICEA S-84-608.

18. The communication cable of claim 17, wherein the optical fibers are operative to transmit optical communication signals along the railway and the communication cable complies with GR-20-Core.

19. The communication cable of claim 16, wherein the communication cable complies with at least one industry standard for fiber optic communications and at least one industry standard for copper telecommunications.

20. The communication cable of claim 16, wherein the bundle of twisted pairs of individually insulated electrical conductors comprises about twelve pairs of individually insulated electrical conductors, wherein the ring of buffer tubes comprises about twelve buffer tubes, and wherein the filling compound comprises a greasy substance.

21. The communication cable of claim 16, wherein the water swellable yarns are disposed between the ring of buffer tubes and the bundle of twisted pairs of individually insulated electrical conductors, wherein the water swellable tape is disposed between the ring of buffer tubes and the metal armor, and wherein each of the strength rods comprises steel.

22. A communication cable comprising:

a metal armor defining an interior space extending lengthwise along a longitudinal axis of the communication cable;

a first jacket circumferentially covering the metal armor and having an outer diameter less than approximately 20 millimeters;

two strength members disposed between an exterior surface of the first jacket and the metal armor, the longitudinal axis substantially disposed between the two strength members;

a bundle of twisted pairs of individually insulated electrical conductors substantially circumferentially covered by a second jacket, with the longitudinal axis extending lengthwise through the bundle of twisted pairs, at least two of the twisted pairs having a different twist rate;

a ring of buffer tubes circumferentially disposed about the second jacket, between the metal armor and the second jacket, each buffer tube carrying a respective bundle of optical fibers; and a plurality of water swellable yarns and a water swellable tape adjoining a plurality of the buffer tubes.

23. The communication cable of claim 22, wherein air extends lengthwise along the communication cable in interstitial spaces among the twisted pairs.

24. The communication cable of claim 22, further comprising a flame retardant material.

* * * * *